United States Patent [19]

Valenti et al.

[11] Patent Number: 5,612,396

[45] Date of Patent: Mar. 18, 1997

[54] COPOLYMERS

[75] Inventors: Salvatore Valenti, Binningen; Bernhard Leikauf, Linn, both of Switzerland; Akira Ohta, Chigasaki, Japan

[73] Assignee: Sandoz Ltd., Basel, Switzerland

[21] Appl. No.: 471,544

[22] Filed: Jun. 6, 1995

Related U.S. Application Data

[63] Continuation of Ser. No. 272,709, Jul. 8, 1994, abandoned, which is a continuation-in-part of Ser. No. 108,961, Aug. 18, 1993, abandoned, which is a continuation of Ser. No. 814,020, Dec. 26, 1991, abandoned.

[30] Foreign Application Priority Data

Dec. 29, 1990 [DE] Germany ............ 40 42 182.1

[51] Int. Cl.$^6$ ........................... C08K 5/098
[52] U.S. Cl. ............... 524/5; 524/549; 524/588; 525/103; 525/327.1; 525/384
[58] Field of Search ............ 524/5, 549, 588; 525/103, 327.4, 384

[56] References Cited

U.S. PATENT DOCUMENTS

| | | | |
|---|---|---|---|
| 2,884,388 | 4/1959 | Hedlund | 525/388 |
| 3,392,155 | 7/1968 | Musket | 525/327.5 |
| 3,399,109 | 8/1968 | Zimmerman | 525/327.5 |
| 3,563,930 | 2/1971 | Stram | 524/5 |
| 3,678,016 | 7/1972 | Zimmerman et al. | 525/327.6 |
| 3,770,687 | 11/1973 | Metetsky | 525/103 |
| 3,855,052 | 12/1974 | Metetsky | 525/103 |
| 3,917,573 | 11/1975 | Perekh | 525/327.7 |
| 4,195,141 | 3/1980 | Buning et al. | 525/103 |
| 4,255,299 | 3/1981 | Daiman et al. | 525/103 |
| 4,655,838 | 4/1987 | Koga et al. | 106/90 |
| 4,946,505 | 8/1990 | Jungk | 106/712 |
| 5,158,996 | 10/1992 | Valenti | 524/5 |

FOREIGN PATENT DOCUMENTS

| | | |
|---|---|---|
| 306449 | 3/1989 | European Pat. Off. . |
| 2312616 | 9/1974 | Germany . |
| 52-00937 | 1/1977 | Japan . |
| 2-117922 | 5/1990 | Japan . |
| 2279729 | 11/1990 | Japan ............ 525/103 |
| 1152859 | 5/1969 | United Kingdom . |
| 2164339 | 3/1986 | United Kingdom . |

OTHER PUBLICATIONS

Encyclopedia of Polymer Science and Engineering., vol. 16, p. 533.
Derwent Abstract No. 87–061536/09, abstracting JP 62017055, *Cement Additive To Improve Dispersion and Flow*, Idemitsu Petrochem Co. (Jul. 1985).

*Primary Examiner*—Ralph H. Dean
*Attorney, Agent, or Firm*—Robert S. Honor; Carl W. Battle; Carol A. Loeschorn

[57] ABSTRACT

A random copolymer in free acid or salt form having the following types and numbers of monomer units;

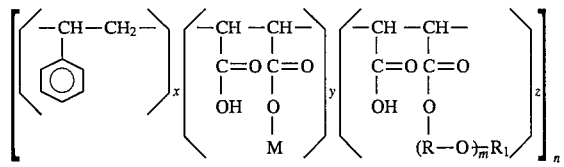

in which M is hydrogen or a residue of a hydrophobic polyalkylene glycol or polysiloxane, R is an $C_{2-6}$alkylene radical, $R_1$ is a $C_{1-20}$ alkyl, $C_{6-9}$cycloalkyl or phenyl group, x,y and z are numbers from 1 to 100, m is a number from 1 to 100, n is a number from 10 to 100, with the provisos, that i) the ratio of x to (y+z) is from 1:10 to 10:1 inclusive, ii) the ratio of z:y is from 5:1 to 100:1, and iii) m+n=15–100.

The copolymers are useful as additives in cementitious compositions.

22 Claims, No Drawings

COPOLYMERS

This is a continuation of application Ser. No. 08/272,709, filed Jul. 8, 1994, which in turn is a continuation-in-part of application Ser. No. 08/108,961, filed Aug. 18, 1993, which in turn is a continuation of application Ser. No. 07/814,020, filed Dec. 26, 1991, all now abandoned.

This invention is concerned with new organic copolymers which can be used as additives to cementitious mixes.

More particularly, the invention relates to a random copolymer in free acid or salt form having the following types and numbers of monomer units;

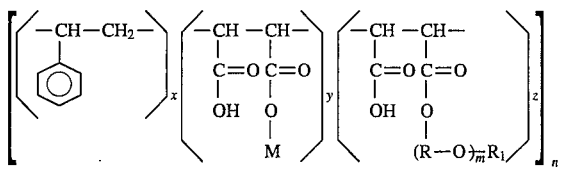

in which M is hydrogen or the residue of a hydrophobic polyalkylene glycol or polysiloxane, R is an $C_{2-6}$alkylene radical, $R_1$ is a $C_{1-20}$ alkyl, $C_{6-9}$cycloalkyl or phenyl group, x, y and z are numbers from 1 to 100, m is a number from 1 to 100, n is a number from 10 to 100, with the provisos, that i) the ratio of x to (y+z) is from 1:10 to 10:1 inclusive, ii) the ratio of z:y is from 5:1 to 100:1, and iii) m+n=15–100.

It will be clear to the man skilled in the art that all numbers given above are average values and that the units of styrene and maleic acid ester are randomly distributed in the copolymer.

The organic copolymers of styrene and maleic acid half ester preferably have a weight average molecular weight from 5,000 to 100,000 more preferably from 10,000 to 30,000 and preferably have an even distribution of styrene and maleic acid half ester units, i.e. the ratio of x to (y+z) is from 1:3 to 3:1, most preferably the ratio of x to (y+z) is 1:1. Most preferred copolymers have a weight average molecular weight of about 13,000.

The weight average molecular weight (Mw) is determined by HPLC (high pressure liquid chromatography) analysis using a polystyrene sulfonate standard.

in formula I, any alkyl or alkylene groups may be linear or branched and each R, independently, is preferably a $C_{2-3}$ alkylene group, most preferably each R is the same and is ethylene. Each $R_1$, independently, is preferably $C_{1-2}$alkyl, more preferably all groups $R_1$ are methyl. m preferably is a number from 7 to 20, most preferably 10–15.

M is preferably the residue of a copolymer consisting of units derived from ethylene oxide and propylene oxide or the residue of a polysiloxane consisting of di-$C_{1-4}$alkylsiloxane units. The ethyleneoxide/propylene oxide copolymers may be represented by formula I $$R_2-O-(CH_2CH_2O)_p-(CH-CH_2O)_q-(CH_2CH_2O)_r-H \quad (I)$$
$$\phantom{R_2-O-(CH_2CH_2O)_p-(}CH_3$$

in which $R_2$ is hydrogen or has, independently, the same meaning as $R_1$ above, and p, q and r are numbers from 0 to 100 with the provisos that at least one of p, q, and r is at least 1, and that q>p+r. Preferred polysiloxanes correspond to formula II

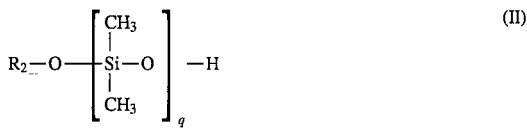

in which q has the same significance as previously mentioned.

Alternatively, H is the residue of a polypropylene glycol having from 10 to 200 units derived from propylene oxide.

In order to have the necessary molecular weight, the copolymers of the invention contain at least 12, preferably from 18 to 40 structural units of formula I, i.e. n is preferably a number from 18 to 40. This means that the sum of m+n preferably is a number from 25 to 60. The acid groups of the copolymers with structural units of formula I may be in free acid or salt form. These salts may be alkali, alkaline earth, ferrous, aluminum, (alkanol)ammonium or (alkyl)ammonium salts. Preferably these copolymers are in the form of alkali metal salts, particularly sodium salts. The copolymers correspond to the formula

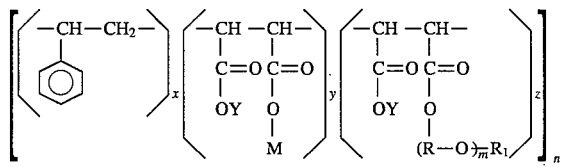

wherein M, R, $R_1$, x, y, z, m and n are as defined above and Y is hydrogen, an alkali or alkaline earth metal ion, ferrous ion, aluminum ion, (alkanol)ammonium ion or (alkyl)ammonium ion, with the provisos that i) the ratio of x to (y+z) is from 1:10 to 10:1 inclusive, ii) the ratio of z:y is from 5:1 to 100:1, and iii) m+n=15–100.

Organic copolymers with structural units of formula I may be produced by methods well know in the art, for example, by reacting a random copolymer of the following composition

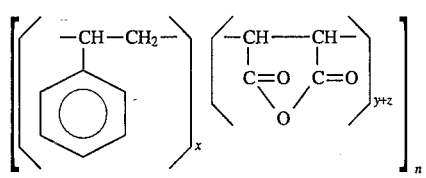

with a compound of formula III

$$R_1-O-(-R-O)_m-H \quad (III)$$

as well as with compounds of formula I or II in the appropriate amounts and optionally reacting the resulting copolymer with an alkali or alkaline earth base, with ferrous or aluminium salts or with ammonia, an alkanolamino or an alkylamino compound. Depending on the amounts used, the reaction of the maleic acid anhydride groups in the styrene—maleic anhydride copolymer shown hereinabove with compounds of formula I or II and III may be substantially complete, or there may remain in the final polymer a number of anhydride groups which will form dicarboxylic acid groups in aqueous solution. A 100% transformation which theoretically can be obtained with equimolar amounts of the reactants will, of course, never be achieved.

Preferably almost all units of maleic anhydride in the styrene—maleic anhydride copolymer are transformed into half-ester units, which can be measured by determination of the acid number of the obtained copolymer.

Copolymers of the type described hereinabove are obtained by copolymerization of styrene and maleic acid anhydride and are well known and are described for example in C. E. Schildknecht, "Vinyl and Related Polymers" John Wiley and Sons, Inc., New York, 1952.

Polyalkylene glycols of formula I or III are also well-known compounds and may be obtained by addition of alkylene oxides, especially ethylene oxide and propylene oxide to alkyl- or cycloalkylalcohols or phenols, or by polyaddition of the alkylene oxides.

The polysiloxanes of formula II are also well-known compounds and may be obtained, for example, by the polycondensation of dichlorodimethylsilane with chlorotrimethylsilane and water.

The new copolymers with recurring units of formula I are excellent surfactants and may be used to disperse organic and inorganic materials. In particular, they may be used as additives for cementitious mixes.

Cementitious mixes, in which the organic copolymers of the invention may be used as additives, are mortars and concretes. The hydraulic binder may be Portland cement, alumina cement or blended cement, for example, pozzolanic cement, slag cement or other types, Portland cement being preferred.

The organic copolymers of the invention are added in amounts of from 0.01 to 10%, preferably from 0.1 to 3% by weight based on the weight of the cement. In such amounts, the organic copolymers of the invention have the property of fluidifying the cementitious mixes to which they have been added and are therefore excellent superplasticizers. They have the additional advantage of having a degree of air entraining properties which is lower than those of similar copolymers suggested for use in such applications, e.g. the copolymers covered by U.S. Pat. No. 5,158,996. Cementitious mixes comprising the SMA copolymers of the present invention exhibit excellent physical properties in the hardened concrete, e.g. high strength.

Further admixtures conventional in cement technology, for example, set accelerators or retarders, frost protection agents, pigments, etc. may also be present in the cementitious mixes of the invention.

The following examples, in which all parts, ratios and percentages are by weight and all temperatures are expressed in degrees Centigrade, illustrate the invention.

EXAMPLE 1

26.13 parts of maleic acid anhydride, are melted at 60° in a flask under an atmosphere of nitrogen and mixed with 60 parts of polyethylene glycol 500. While stirring, 0.01 parts hydroquinone methylether and 0.666 parts dodecyl mercaptan is added and finally 1.17 parts azo diisobutyronitrile are dissolved to give a clear yellowish solution (solution A).

In another flask equipped with stirrer, thermometer, cooling and two funnels (dosage pumps) 60 parts polyethylene glycol 500 and 1.3 parts maleic acid anhydride are mixed while stirring. The flask is purged with nitrogen for 5 minutes and kept under nitrogen. The clear colorless fluid is heated to 100°, and when the temperature is reached, there are added simultaneously the solution A at a rate of 1.45 parts/minute and 26.66 parts styrene at a rate of 0.45 parts/minute, the addition being made over one hour. The solution is then stirred at 100° for another hour, 0.12 parts azo diisobutyronitrile are added and stirring is continued for a further hour at the same temperature.

The solution is heated to 140° and 12.83 parts of a polyalkylene glycol sold under the trade name "Pluronic" PE 6100 is added over 5 minutes. The temperature is maintained and the mixture is stirred for a further 2 hours. After cooling to about 60°–70°, the solution is diluted with 235 parts deionized water. After cooling to room temperature, the emulsion is neutralized with about 28.5 parts of sodium hydroxide solution (30%) and adjusted to a solids content of 40%.

EXAMPLES 2–20

Analogous products are obtained by means of the process of Example 1 using different quantities of polyethylene glycol (expressed as molar ratios of free acid to half ester)

1:0.94
1:0.85
1:0.75
1:0.65
1:0.55 when using other hydrophobic polyalkylene glycols

| | |
|---|---|
| "Pluronic" PE 6100 | (BASF) |
| "Pluronic" PE 3100 | (BASF) |
| SYNPERONIC PE L-61 | (ICI) |
| DOWFAX 20 A 64 | (DOW) |
| DOWFAX 20 A 612 | (DOW) |
| SYNALOX 50-50 B | (DOW) |
| SYNALOX 100-150 D | (DOW) |
| SYNALOX 100-D95 | (DOW) |
| CC-118 | (Nippon Oil & Fats) |
| CD-115 | (MBT) | when using different polysiloxanes

| | |
|---|---|
| VP 1610 | (Wacker) |
| SLM 50400/61 | (Wacker) |
| SLM 50400/62 | (Wacker) |
| SLM 50480/6 | (Wacker) | and/or when using different polyethylene glycols with molecular weight=500 (m=11)

with molecular weight=350 (m=8)

with molecular weight=650 (m=15)

All syntheses are performed without using an additional solvent. The polyethylene glycol serves as a solvent at 100° and is esterified with the copolymer of maleic acid anhydride and styrene at 140°.

"Pluronic" PE 6100 has a molar mass of the propylene oxide block of 1750 g/mol and a percentage of polyethylene oxide of 10%.

"Pluronic" PE 3100 has a molar mass of the propylene oxide block of 950 g/mol and a percentage of polyethylene oxide of 10%.

"Synperonic" PE L-61 is a block copolymer of propylene oxide and ethylene oxide having a molar mass of 2090 g/mol.

"Dowfax" 20 A 64 is a block copolymer of propylene oxide and ethylene oxide having a molar mass of 7209 g/mol.

"Dowfax" 20 A 612 is a block copolymer of propylene oxide and ethylene oxide having a molecular weight of 1000.

"Synalox" 50-50B is a random copolymer of propylene oxide and ethylene oxide having a molar mass of 1200 g/mol, "Synalox" 100-150 D is a random copolymer of propylene oxide and ethylene oxide having a molecular weight of 2750.

"Synalox" 100-D95 is a polymer of propylene oxide having a molecular weight of 2000.

CC-118 is a butylether of the block copolymer of 27 mol propylene oxide and 4 mol ethylene oxide.

CD-115 is a block copolymer of propylene oxide and ethylene oxide with methylether and hydroxy end groups, The molar mass of the propylene oxide block is 1900 g/mol and the percentage of polyethylene oxide is 5%.

VP 1610 is a polydimethylsiloxane with hydroxy propylene end group having a molecular weight of 650.

SLM 50400/61 is one with hydroxy pentamethylene end group having a molecular weight of 3000.

SLM 50400/62 is one with hydroxypropylene end group having a molecular weight of 3000.

SLM 50480/6 is a polydimethylsiloxane with hydroxypropylene end group which is etherified with 10 ethylene oxide groups and having a molecular weight 1400.

Application Example A

A mortar is mixed in accordance with DIN 1164, Part 7 with the following constituents: 1350 g of well-mixed standard sand, 450 g Portland cement and 180 g tap water. The tap water contains 0.3% of the compound of Example 1, calculated as dry matter on the weight of cement. The mortar is mixed according to standard conditions, and immediately after mixing the consistency of the mortar is determined according to DIN 1060, Part 3; DIN 1048, Part 1 or any other standard method.

For purposes of comparison to the mortar according to the invention, the same mixes are prepared but without any admixture, or containing a condensation product of naphthalene sulfonate or melamine sulfonate and formaldehyde using the same dosage (0.3% by weight of dry matter, based on cement). From the results of testing it can be seen that the fluidity characteristics of the mortar of the invention is much better than those of the comparative mortar.

The same results are obtained when, instead of the one of Examples a compound of Examples 2–20 is used.

Application Example B

Concrete mixes are prepared according to the following recipe:

Aggregate with mesh 0–16 mm in the area A/B in accordance with DIN 1045:

| mesh 1 mm | 20% |
| mesh 4 mm | 45% |
| mesh 8 mm | 70% |
| mesh 16 mm | 100% |
| powder content | 8% |

Portland cement Type I ASTM C150 (Holderbank, Rekingen, Switzerland 350 kg/m³ concrete Mixing water 40%

The mixing is performed in a ribbon blender, the water being added within the first 30 seconds and the mixing continued for a total of 2 minutes.

A comparative concrete mix containing a condensation product of naphthalene sulfonate and formaldehyde is prepared. In both cases, 0.3% by weight of the admixture, based on cement, is added to the mixing water. After mixing, the fluidity of the fresh concrete is determined, either according to ASTM C 143 (slump) or according to DIN 1048 (flow table). Concrete mixes containing an admixture of the invention exhibit better consistency and fluidity than do comparative mixes without or with conventional admixtures.

We claim:

1. A random copolymer in free acid or salt form having the following formula

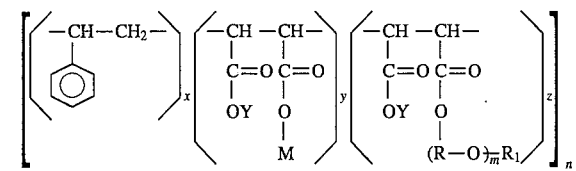

in which M is a polysiloxane or a residue of a hydrophobic polyalkylene glycol having the formula

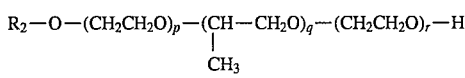

wherein wherein Y is hydrogen, an alkali or alkaline earth metal ion, ferrous ion, aluminum ion, (alkanol)ammonium ion or (alkyl)ammonium ion, R is a $C_{2-6}$ alkylene radical, $R_1$ is a $C_{1-20}$ alkyl, $C_{6-9}$ cycloalkyl or phenyl group, $R_2$ is hydrogen or $R_1$, x, y and z are numbers from 1 to 100, m is a number from 1 to 100, n is a number from 10 to 100, p, q and r are numbers from 0–100, provided that at least one of p, q and r is at least 1 and that q>p+r provided that i) the ratio of x to (y+z) is from 1:10 to 10:1 inclusive, ii) the ratio of z:y is from 5:1 to 100:1, and iii) m+n=15–100, and iv) M is different from $-(R-O)_m-R_1$.

2. A random copolymer according to claim 1 wherein M is a hydrophobic polyalkylene of formula II and R is $-CH_2-CH_2-$.

3. A random copolymer according to claim 1 wherein M is the residue of polysiloxane of the formula

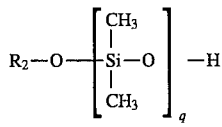

wherein $R_2$ is hydrogen, a $C_{1-20}$ alkyl, a $C_{6-9}$ cycloalkyl or a phenyl group and q is a number from 1–100.

4. A process for the preparation of a copolymer according to claim 1 comprising reacting a random copolymer of the following formula

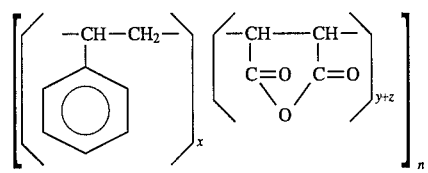

with a compound of Formula IV

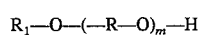    (IV)

as well as with a compound of Formula II

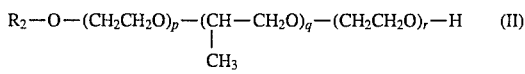

or Formula III

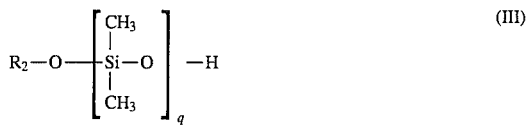

wherein $R_1$ and R are defined in claim 1; $R_2$ is hydrogen or $R_1$; and p, q and r are numbers from 0–100, provided that at least one of p, q and r is at least 1 and that q>p+r in the appropriate amounts and optionally, forming a salt by reacting the resulting copolymer with an alkali or alkaline earth base, with ferrous or aluminum salts or with ammonia or with an alkylamino or alkanolamino compound.

5. A process for improving the fluidity of cementitious mixes comprising a hydraulic binder, aggregate and water, which process comprises the step of adding to the cementitious mix a random copolymer in free acid or salt form having the following formula

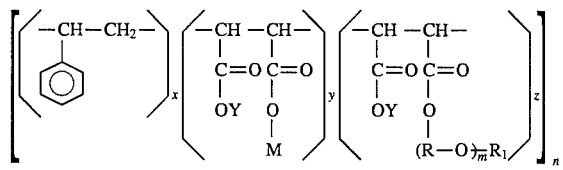

in which M is a residue of a hydrophobic polyalkylene glycol or polysiloxane, wherein Y is hydrogen, an alkali or alkaline earth metal ion, ferrous ion, aluminum ion, (alkanol)ammonium ion or (alkyl)ammonium ion, R is a $C_{2-6}$ alkylene radical, $R_1$ is a $C_{1-20}$ alkyl, $C_{6-9}$ cycloalkyl or phenyl group, x, y and z are numbers from 1 to 100, m is a number from 1 to 100, n is a number from 10 to 100, provided that i) the ratio of x to (y+z) is from 1:10 to 10:1 inclusive, ii) the ratio of z :y is from 5:1 to 100:1, iii) m+n=15–100, and iv) M is different from $(R—O)_m—R_1$.

6. The process of claim 5 in which the ratio of x to (y+z) is from 1:3 to 3:1.

7. The process of claim 5 wherein R is an ethylene group, $R_1$ is methyl, the ratio of x to (y+z) is 1:1, m is a number of from 11–12 and n is a number from 18–25.

8. The process of claim 5 wherein the random copolymer has a weight-average molecular weight of from 5,000 to 100,000.

9. The process of claim 5 wherein M is the residue of a hydrophobic polyalkylene glycol.

10. The process of claim 5 wherein M is the residue of a copolymer consisting of units derived from ethylene oxide and propylene oxide having the formula

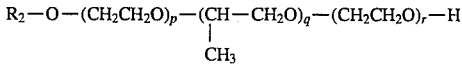

in which $R_2$ is hydrogen, a $C_{1-20}$ alkyl, $C_{6-9}$ cycloalkyl or phenyl group; p, q and r are numbers from 0 to 100 with the provisos that at least one of p,q, and r is at least 1, and that q>p+r.

11. The process of claim 10 wherein R is —$CH_2$—$CH_2$—.

12. The process of claim 5 wherein M is the residue of polysiloxane of the formula

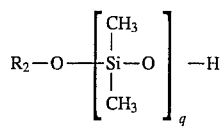

wherein $R_2$ is hydrogen, a $C_{1-20}$ alkyl, a $C_{6-9}$ cycloalkyl or a phenyl group and q is a number from 1–100.

13. The process of claim 5 wherein M is the residue of a polypropylene glycol having from 10 to 200 units derived from propylene.

14. A cementitious mix comprising a cementitious product and a random copolymer in free acid or salt form having the following formula

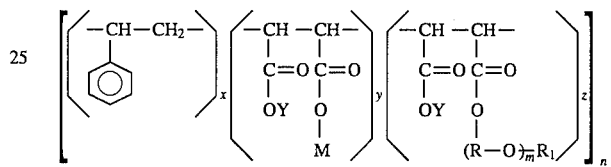

in which M is a residue of a hydrophobic polyalkylene glycol or polysiloxane, wherein Y is hydrogen, an alkali or alkaline earth metal ion, ferrous ion, aluminum ion, (alkanol)ammonium ion or (alkyl)ammonium ion, R is a $C_{2-6}$ alkylene radical, $R_1$ is a $C_{1-20}$ alkyl, $C_{6-9}$ cycloalkyl or phenyl group, x, y and z are numbers from 1 to 100, m is a number from 1 to 100, n is a number from 10 to 100, provided that i) the ratio of x to (y+z) is from 1:10 to 10:1 inclusive, ii) the ratio of z:y is from f:1 to 100:1, and iii) m+n=15–10, and iv) M is different from $(R—O)_m—R_1$.

15. A cementitious mix according to claim 14 wherein M is the residue of a hydrophobic polyalkylene glycol.

16. A cementitious mix according to claim 15 wherein M is the residue of a copolymer consisting of units derived from ethylene oxide and propylene oxide having the formula

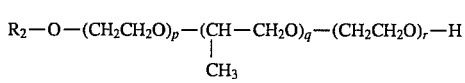

in which $R_2$ is hydrogen, a $C_{1-20}$ alkyl, $C_{6-9}$ cycloalkyl or phenyl group; p, q and r are numbers from 0 to 100 with the provisos that at least one of p,q, and r is at least 1, and that q>p+r.

17. A cementitious mix according to claim 16 wherein R is —$CH_2$—$CH_2$—.

18. A cementitious mix according to claim 14 wherein M is the residue of polysiloxane of the formula

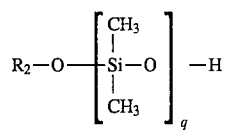

wherein $R_2$ is hydrogen, a $C_{1\text{-}20}$ alkyl, a $C_{6\text{-}9}$ cycloalkyl or a phenyl group and q is a number from 1–100.

19. A cementitious mix according to claim 14 wherein M is the residue of a polypropylene glycol having from 10 to 200 units derived from popylene oxide.

20. A cementitious mix according to claim 14 wherein the random copolymer has an average molecular weight of from 10,000 to 30,000.

21. A cementitious mix according to claim 14 wherein the random copolymer is present in an amount from about 0.01 to 10% by weight based on the weight of the cement.

22. A cementitious mix according to claim 14 wherein the random copolymer is present in an amount from about 0.1 to 3% by weight based on the weight of the cement.

* * * * *

UNITED STATES PATENT AND TRADEMARK OFFICE
CERTIFICATE OF CORRECTION

PATENT NO.   : 5,612,396

DATED        : March 18, 1997

INVENTOR(S)  : Salvatore VALENTI, Bernhard LEIKAUF and Akira OHTA

It is certified that error appears in the above-identified patent and that said Letters Patent is hereby corrected as shown below:

In column 6, line 23, delete the word "wherein".

In column 8, line 18, after the word "propylene", insert the word --oxide--.

In column 10, line 2, delete the word "an" and insert --a weight--.

Signed and Sealed this

Seventeenth Day of June, 1997

Attest:

BRUCE LEHMAN

*Attesting Officer*   *Commissioner of Patents and Trademarks*